Figures 4, 5, 6:
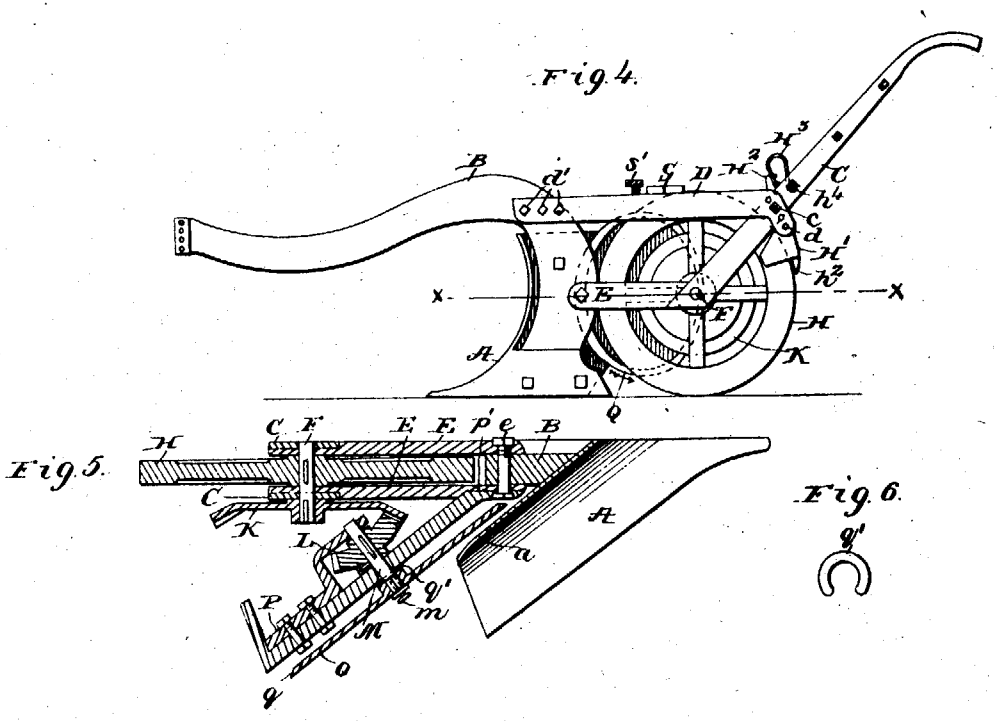

S. G. SEVIER.
3 Sheets—Sheet 1.
PLOW.
No. 11,595.
Reissued Apr. 6, 1897.
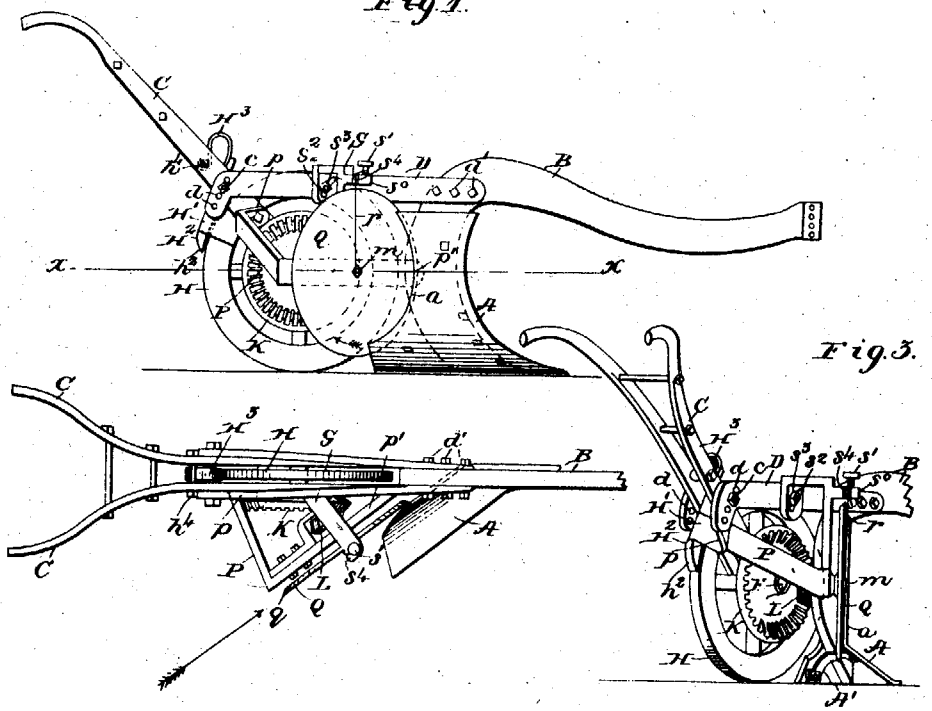
Witnesses
Alfred A. Mackey
Chas. Barrett
Inventor
S. G. Sevier.
By his Attorneys
Kellett & Stover 3 Sheets—Sheet 2.

S. G. SEVIER.

PLOW.

No. 11,595. Reissued Apr. 6, 1897.

Witnesses,
Alfred A. Medley
Chas. Barnett

Inventor
S. G. Sevier.
By his Attorneys
Kilgore & Starr.

3 Sheets—Sheet 3.
S. G. SEVIER.
PLOW.
No. 11,595. Reissued Apr. 6, 1897.
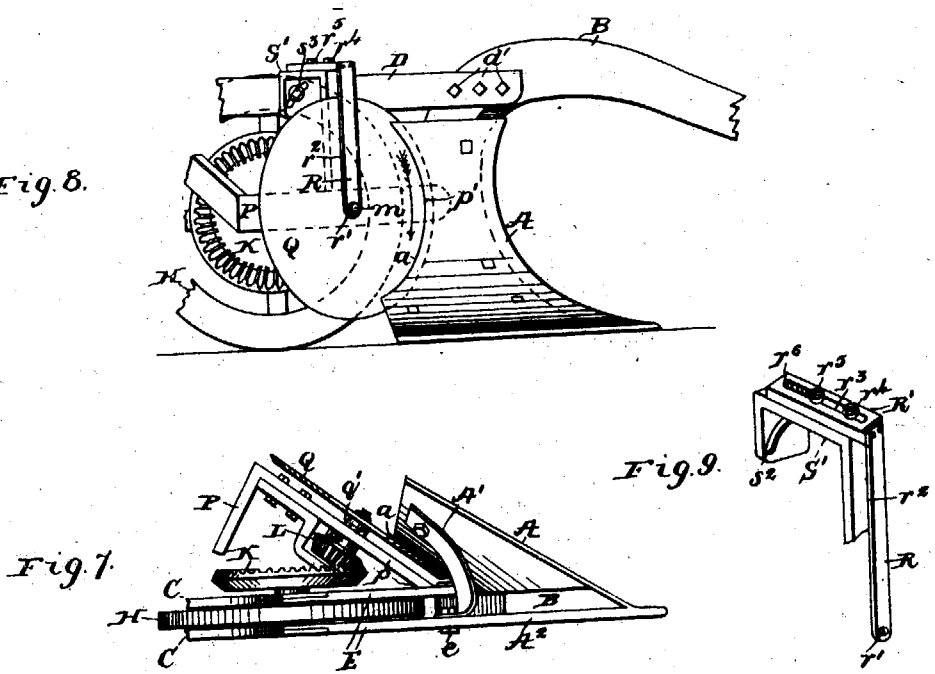
Witnesses,
Alfred A. Mathey
Chas Baeert
Inventor
S. G. Sevier.
By his Attorneys
Keller & Starck

UNITED STATES PATENT OFFICE.

SAMUEL G. SEVIER, OF OENAVILLE, TEXAS.

PLOW.

SPECIFICATION forming part of Reissued Letters Patent No. 11,595, dated April 6, 1897.

Original No. 549,827, dated November 12, 1895. Application for reissue filed December 10, 1896. Serial No. 615,109.

*To all whom it may concern:*

Be it known that I, SAMUEL G. SEVIER, a citizen of the United States, residing at Oenaville, in the county of Bell and State of Texas, have invented certain new and useful Improvements in Plows, of which the following is a full, clear, and exact description, reference being had to the accompanying drawings, forming a part hereof.

My invention has relation to improvements in plows; and it consists in the novel arrangement and combination of parts more fully set forth in the specification and pointed out in the claims.

In the drawings, Figure 1 is a side elevation of the plow. Fig. 2 is a plan view of the same. Fig. 3 is a perspective view as seen from the rear and right. Fig. 4 is an elevation of the plow from the opposite side from that shown in Fig. 1. Fig. 5 is a section on line *x x* of Figs. 1 and 4, looking down. Fig. 6 is a side elevation of one of the detachable washers used in adjusting the face of the revolving moldboard. Fig. 7 is an inverted plan view of the plowshare and attachments. Fig. 8 is a similar view to Fig. 7, but showing another form of cleaning device for the revolving moldboard; and Fig. 9 represents a detail perspective view of the knife for cleaning off the moldboard and the manner of attaching the same to the plow.

The object of my invention is to construct a turning-plow in which the drive-wheel actuates a vertically-disposed plane circular moldboard, the position of such moldboard relative to the plowshare being such as to render the plow thoroughly effective and uniform in its action.

A further object is to provide special devices for the vertical adjustment of the bearings of the drive-wheel and moldboard actuated thereby; and a further object is to produce a plow which will possess features of superiority, as will more fully appear in a detailed description of the device, which is as follows:

Referring to the drawings, A represents the plowshare, which is cut away, as at *a*, in front of the revolving plane circular moldboard Q and is secured to the landside $A^2$ by the curved piece A′.

B represents the plow-beam, to which the plowshare is attached.

C represents the handles, which are connected by the bolt *c* to the frame D, the said bolt passing through one of the holes *d* of said frame, the latter being rigidly attached to the beam B by means of the bolts *d′*. The lower ends of the handles are connected to the frame E, and the forward end of the said frame is pivotally secured to the beam B by means of the bolt *e*.

The shaft F passes through the junction of the frame E and the handles C and assists in securing them together, while keyed on said shaft is the driving or drive wheel H and the gear-wheel or bevel-pinion K, the drive-wheel being revolved as the plow is drawn over the ground. The pinion K meshes with a similar pinion or gear-wheel L, keyed on the shaft M, which carries the revolving circular plane moldboard Q, the said moldboard being provided with a sharp edge *q*, as best shown in Figs. 3 and 5. The distance of the outer face of the moldboard from the rear and adjacent face of the plowshare is adjusted by means of one or more open or horseshoe-shaped washers *q′*. (Shown in detail in Fig. 6.) If this washer be placed between the frame P and the moldboard Q, then it will be evident that the moldboard will be closest to the plowshare, and if it be placed between the frame P and the gear-wheel L, then the moldboard will be at some distance from the plowshare. These adjustments are desirable, since the frame P is movable about a pivotal point, thereby varying the distance between the plowshare and revolving moldboard. The shaft M is journaled in the frame P, which is attached at *p* to the handles C, and at *p′* is pivoted to the beam B by the bolt *e*, or the frame P may be made integral with the adjacent half or section of the frame E. Moreover, it (the frame P) is supported by the frame S (shown in Figs. 1 to 4) or S′. (Shown in Figs. 7 and 8.) In either case the frame S or S′ is bent over and secured to the frame D by a bolt $s^3$, passing through the diagonal slot $s^2$ in the bent-over portion of the frame, the said bolt $s^3$ being held by a nut in position on the frame D.

In the device shown in Figs. 1 to 5 the frame S is provided with a projecting arm $s^0$, which is dentated, as at $s^1$, to receive the wire $r$, which is wound around the screw $s'$ and is secured to the neck of the stud $m$, which stud is fast to the shaft M and revolves freely within the loop formed at the end of the said wire. It will be seen that the wire may be led into any one of these notches $s^4$, and thus its distance from the face of the moldboard may be varied at will. The function of this wire is to scrape off clods of dirt or other matter that might adhere to the revolving moldboard. Instead of this wire, however, I preferably use the knife R. (Shown in Figs. 8 and 9.) This knife is provided with a bearing $r'$ to receive the pin $m$ and has a cutting edge $r^2$, adapted to scrape the soil off the revolving moldboard. The upper end of this knife is attached to a sliding frame R', which is slotted, as at $r^3$, to admit the shanks of the two holding-screws $r^4$ and $r^5$, and between the screw $r^5$ and the end of the slot is interposed a spring $r^6$, which tends to draw the knife toward the face of the moldboard, and yet to allow the knife to yield outward when necessary.

The frame R' is mounted on the frame S', similar to the frame S already described, except that the arm $s^0$ is omitted.

The drive-wheel H is kept clean by means of the plate H', secured to the handles C, and the scraper $H^2$, which is sharpened, as at $h^2$, and is pressed toward the periphery of the wheel by the spring $H^3$. This spring is secured to the plow-handles, as at $h^4$, and also to the upper end of the scraper $H^2$, the said scraper being pivoted on the bolt $c$.

The object of having the plurality of holes $d$ for the said bolt $c$ is to afford means for raising and lowering the wheel H and the moldboard, which is connected to the supporting-frame thereof, relatively to the plowshare, and thus to raise or lower the point of the plowshare for shallow or deep plowing; and as the revolving moldboard is plane it is apparent that its adjustments relative to the plowshare will not destroy its effectiveness, inasmuch as under all circumstances the same areal portion of its face acts upon the soil plowed up by the plowshare, the moldboard always revolving in a plane parallel to itself; that is, parallel to its face.

The operation of the device will be evident from an inspection of the drawings.

It will be seen that the driving-gear is well protected and is not likely to become clogged up with grass, weeds, or dirt; that the point of the plowshare may be readily and rapidly adjusted, and that the scraper $H^2$ will yield to excessive pressure and may be readily cleaned off, if choked, by the plowman. These and the various other advantages of the herein-described construction will readily suggest themselves to any one skilled in the art.

It will be obvious that various modifications might be made without departing from the spirit of my invention.

Having described my invention, what I claim is—

1. In a plow, a suitable frame, a plowshare carried thereby, a drive-wheel mounted in the rear of the plowshare in suitable bearings, a gear-wheel actuated by the rotation of said drive-wheel, a revolving moldboard also carried by the frame, and a second gear-wheel interposed between the moldboard and the gear-wheel actuated by the drive-wheel for driving said moldboard, and means for positively retaining the moldboard in proximity to the adjacent face or side of the plowshare, substantially as set forth.

2. In a plow, a suitable frame, a plowshare carried thereby, a drive-wheel mounted in the rear thereof in bearings vertically adjustable relative to the plowshare, a gear-wheel driven by said drive-wheel, a plane circular revolving moldboard, a second gear-wheel interposed between the moldboard and the gear-wheel actuated by the drive-wheel, and means for shifting the moldboard and bringing its face in proximity to the plowshare, whatever be the vertical position of said moldboard and drive-wheel relative to the plowshare, substantially as set forth.

3. In a plow, the combination with a driving-wheel mounted in bearings vertically adjustable relative to the plowshare, in rear thereof, a gear-wheel driven thereby, a revolving circular moldboard, and a similar gear-wheel interposed between said revolving moldboard and the first gear-wheel, for driving the said moldboard, substantially as set forth.

4. In a plow, a suitable frame, a plowshare carried thereby, a drive-wheel mounted in the rear of the plowshare, a bevel-pinion actuated by the rotation of the drive-wheel, a plane circular revolving moldboard also carried by the frame, a second bevel-pinion interposed between the moldboard and the first-named pinion for turning the moldboard, and means for retaining the moldboard with its operating face in close proximity to the adjacent face of the plowshare, substantially as set forth.

5. In a plow, the combination with a beam and a plowshare connected thereto, of the frame D fixed to, and the frame E pivoted to said beam; the handle C pivotally connected to said frame D and also connected to said frame E, the frame P connected to the beam and plow-handles, and the frame S connecting said frame P with said frame D, the driving-wheel H and gear-wheel K journaled in said frame E and in the lower ends of said handles, and the gear-wheel L and revolving moldboard Q journaled in said frame P, substantially as and for the purpose set forth.

6. In a plow, the combination with a beam and a plowshare connected thereto, of the frame D fixed to, and the frame E pivoted to said beam; the handles C pivotally connected to said frame D and also connected to said frame E, the frame P connected to the beam and plow-handles; and the frame S connecting said frame P with said frame D; the shaft F journaled in the rear end of said frame E and in the lower end of said handles and securing the said frame and the handles together, the driving-wheel H and the gear-wheel K fast on said shaft F; the shaft M journaled in said frame P and the revolving moldboard Q and gear-wheel L fast on said shaft L, substantially as and for the purpose set forth.

7. In a plow, the combination with a beam and plowshare connected thereto, of the frame D fixed to, and the frame E pivoted to said beam; the handles C pivotally connected to said frame D and also connected to said frame E, the frame P connected to the beam and plow-handles, and the frame S connecting said frame P with said frame D, the driving-wheel H and gear-wheel K journaled in said frame E and in the lower ends of said handles, the gear-wheel L and revolving moldboard Q journaled in said frame P, and the horseshoe-shaped washer interposed between said revolving moldboard and the said wheel L, substantially as and for the purpose set forth.

8. In a plow, the combination with a beam and a plowshare connected thereto, of the frame D fixed to, and the frame E pivoted to said beam; the handles C pivotally connected to said frame D and also connected to said frame E, the frame P connected to the beam and plow-handles; and the frame S connecting said frame P with said frame D; the shaft F journaled in the rear end of said frame E and in the lower end of said handles and securing the said frame and the handles together, the driving-wheel H and the gear-wheel K fast on said shaft F; the shaft L journaled in said frame P, the revolving moldboard Q and gear-wheel L fast on said shaft M; and the horseshoe-shaped washer mounted on said shaft M between the moldboard Q and the gear-wheel L, substantially as and for the purpose set forth.

9. In a plow of the character described, the combination with the revolving moldboard Q, of the central pivot $m$, the knife R connected near one end to said pivot, an adjustable frame attached to the other end of said knife, and a spring normally pressing on said frame so as to bring said knife close against the face of the revolving moldboard, substantially as set forth.

10. In a plow of the character described, a suitable revolving moldboard Q, central pivot $m$, the knife R connected near one end to said pivot, the slotted frame R′ attached to the other end of said knife, the screws $r^4$ and $r^5$ projecting into said slot and connected to the framework of the plow, and a spring $r^6$ interposed between said screw $r^5$, and the end of said slot, for bringing said knife close against the face of said revolving moldboard, substantially as set forth.

In testimony whereof I affix my signature in presence of two witnesses.

SAMUEL G. SEVIER.

Witnesses:

A. S. CLARK,

H. A. BARNWELL.